United States Patent
Wang et al.

(10) Patent No.: US 11,362,392 B2
(45) Date of Patent: Jun. 14, 2022

(54) BATTERY PACK

(71) Applicant: CONTEMPORARY AMPEREX TECHNOLOGY CO., LIMITED, Ningde (CN)

(72) Inventors: Heng Wang, Ningde (CN); Jinqing Ji, Ningde (CN); Wenhui Zhang, Ningde (CN); Mu Qian, Ningde (CN); Yanhuo Xiang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 16/708,227

(22) Filed: Dec. 9, 2019

(65) Prior Publication Data

US 2020/0212393 A1 Jul. 2, 2020

(30) Foreign Application Priority Data

Dec. 29, 2018 (CN) .......................... 201811629973.6

(51) Int. Cl.
*H01M 50/20* (2021.01)

(52) U.S. Cl.
CPC ........ *H01M 50/20* (2021.01); *H01M 2220/20* (2013.01)

(58) Field of Classification Search
CPC .. H01M 50/20; H01M 50/204; H01M 50/207; H01M 50/209; H01M 50/216;
(Continued)

(56) References Cited

U.S. PATENT DOCUMENTS

2011/0104552 A1 5/2011 Kim
2011/0117419 A1* 5/2011 Lee ....................... H01M 50/20
429/156
(Continued)

FOREIGN PATENT DOCUMENTS

CN 103201876 A 7/2013
CN 204857808 U 12/2015
(Continued)

OTHER PUBLICATIONS

English Translation of CN207282567.*
(Continued)

*Primary Examiner* — Kiran Akhtar
(74) *Attorney, Agent, or Firm* — Morgan, Lewis & Bockius LLP

(57) ABSTRACT

The present disclosure provides a battery pack and a device comprising the battery pack, the battery pack comprises a double-layer battery module bracket, an upper-layer battery module, a lower-layer battery module and a supporting mechanism; the double-layer battery module bracket comprises an upper plate; a lower fixing member, an upper fixing member and a fastener; the lower fixing member and the upper plate are configured to enclose a lower accommodating space; the upper fixing member and the upper plate being are configured to enclose an upper accommodating space, a lower portion of the fastener exposed from the lower fixing member is fixed on the supporting mechanism; the upper-layer battery module is accommodated in the upper accommodating space and supported on the upper plate; the lower-layer battery module is accommodated in the lower accommodating space; the supporting mechanism supports the lower-layer battery module and the lower fixing member.

9 Claims, 6 Drawing Sheets

(58) Field of Classification Search
CPC ......... H01M 2220/20; H01M 10/6551; H01M 2/1077; H01M 2/1016; H01M 2/12; H01M 2/1252; Y02E 60/10
See application file for complete search history.

(56) References Cited

U.S. PATENT DOCUMENTS

| | | | | |
|---|---|---|---|---|
| 2011/0151311 | A1* | 6/2011 | Lee ...................... | H01M 50/35 429/156 |
| 2012/0040237 | A1* | 2/2012 | Hamada ................ | H01M 50/20 429/159 |
| 2013/0330587 | A1* | 12/2013 | Takahashi ............. | H01M 50/20 429/99 |

FOREIGN PATENT DOCUMENTS

| | | | | |
|---|---|---|---|---|
| CN | 206076332 | U | 4/2017 | |
| CN | 207165640 | U | 3/2018 | |
| CN | 207282567 | * | 4/2018 | ............ Y02E 60/10 |
| CN | 207282567 | U | 4/2018 | |
| CN | 207409566 | U | 5/2018 | |
| CN | 207781676 | U | 8/2018 | |
| CN | 209104238 | U | 7/2019 | |

OTHER PUBLICATIONS

Contemporary Amperex Technology Co., Limited, the first office action, 201811629973.6, dated Aug. 20, 2020, 10 pgs.
Contemporary Amperex Technology Co., Limited, International Search Report and Written Opinion, PCT/CN2019/123692, dated Mar. 6, 2020, 12 pgs.
English Translation of CN207282567U, dated Apr. 27, 2018, 10 pgs.
Wang, Office Action, U.S. Appl. No. 17/129,587, dated Mar. 30, 2021, 26 pgs.
Wang, Final Office Action, U.S. Appl. No. 17/129,587, dated May 24, 2021, 30 pgs.

* cited by examiner

BATTERY PACK

CROSS-REFERENCE TO RELATED APPLICATIONS

The present application claims priority to Chinese patent application No. CN201811629973.6, filed on Dec. 29, 2018, which is incorporated herein by reference in its entirety.

TECHNICAL FIELD

The present disclosure relates to the field of battery, and more specifically relates to a battery pack and a device.

BACKGROUND

A battery pack generally arranges a battery module in a single layer manner. When the electrical requirements of electrical device (such as electric vehicles) are relatively high (for example, increasing endurance), the battery pack needs to make full use of a limited height space in a Z direction, and if necessary, arranges the battery modules in a double layer manner. Since the battery modules in double-layer need to be stacked in the Z direction, the supporting stability of the battery modules in double-layer becomes very important.

SUMMARY

In view of the problem existing in the background, an object of the present disclosure is to provide a battery pack and a device comprising the battery pack, the battery pack can arrange battery modules in a double-layer manner and improve the supporting stability of the battery modules in double-layer.

In order to achieve the above object, in one respect, the present disclosure provides a battery pack which comprises a double-layer battery module bracket, an upper-layer battery module, a lower-layer battery module and a supporting mechanism. The double-layer battery module bracket comprises an upper plate; a lower fixing member positioned below the upper plate and supporting the upper plate, the lower fixing member and the upper plate are configured to enclose a lower accommodating space; an upper fixing member positioned above the lower fixing member and fixed to the upper plate, the upper fixing member and the upper plate are configured to enclose an upper accommodating space, a projection of a lower surface of the upper fixing member and a projection of an upper surface of the lower fixing member in a Z direction at least partially overlap; and a fastener passing through the upper fixing member, the upper plate and the lower fixing member along the Z direction within a range in which the projections in the Z direction overlap, a lower portion of the fastener exposed from the lower fixing member is fixed on the supporting mechanism; the upper-layer battery module is accommodated in the upper accommodating space and supported on the upper plate; the lower-layer battery module is accommodated in the lower accommodating space; the supporting mechanism supports the lower-layer battery module and the lower fixing member.

In an embodiment, a periphery edge of the upper plate has a first side along an X direction; the lower fixing member comprises a first lower fixing member; the upper fixing member comprises a first upper fixing member, the first upper fixing member is positioned at the first side of the periphery edge of the upper plate, the first upper fixing member corresponds to the first lower fixing member; the first upper fixing member is positioned above the first lower fixing member and the first upper fixing member is staggered along a Y direction with respect to the first lower fixing member, such that a projection of a lower surface of the first upper fixing member and a projection of an upper surface of the first lower fixing member in the Z direction partially overlap, the fastener passes through the first upper fixing member and the first lower fixing member along the Z direction within a range in which the projections in the Z direction overlap.

In an embodiment, at the same first side of the periphery edge of the upper plate, the corresponding first upper fixing member and first lower fixing member are provided on each of left and right sides of an X direction center line of the upper plate. Staggering of the first upper fixing member on the left side of the X direction center line of the upper plate with respect to the corresponding first lower fixing member along the Y direction is opposite to staggering of the first upper fixing member on the right side of the X direction center line of the upper plate with respect to the corresponding first lower fixing member along the Y direction; the corresponding fastener passes through the corresponding first upper fixing member and first lower fixing member along the Z direction within the corresponding range in which the projections in the Z direction overlap.

In an embodiment, the double-layer battery module bracket further comprises a first locking member, the first locking member is arranged side by side with the corresponding fastener, the first locking member passes through the first upper fixing member and the upper plate along the Z direction outside the range in which the projections in the Z direction overlap and fixes the first upper fixing member to the upper plate.

In an embodiment, the double-layer battery module bracket further comprises a second locking member, the second locking member is arranged side by side with the corresponding fastener, the second locking member passes through the upper plate and the first lower fixing member along the Z direction outside the range in which the projections in the Z direction overlap and fixes the first upper plate and the first lower fixing member on the supporting mechanism.

In an embodiment, the first lower fixing member is integrally formed with a first convex portion, the first convex portion protrudes from a bottom portion of the first lower fixing member in a direction away from the second locking member; the double-layer battery module bracket further comprises a third locking member, the third locking member passes through the first convex portion along the Z direction and fixes the first lower fixing member on the supporting mechanism.

In an embodiment, the upper fixing member further comprises a second upper fixing member, the second upper fixing member is positioned at the first side of the periphery edge of the upper plate along the X direction; the lower fixing member comprises a second lower fixing member, the second upper fixing member is positioned just above the second lower fixing member, such that a projection of one of a lower surface of the second upper fixing member and an upper surface of the second lower fixing member in the Z direction falls entirely within a projection of the other of the lower surface of the second upper fixing member and the upper surface of the second lower fixing member, the corresponding fastener passes through the second upper fixing member and the second lower fixing member along the Z direction in a range in which the projections in the Z direction overlap.

In an embodiment, a periphery edge of the upper plate has a second side along a Y direction; the double-layer battery module bracket further comprises a lower supporting member, the lower supporting member is positioned at the second side of the periphery edge of the upper plate along the Y direction, an upper side of the lower supporting member in the Z direction is fixedly connected to the upper plate, a lower side of the lower supporting member in the Z direction is fixedly connected to the supporting mechanism.

In an embodiment, the upper plate comprises a receiving groove positioned at a periphery edge, a bottom portion of the upper fixing member is received in the receiving groove.

In an embodiment, the upper plate comprises flanges formed at the receiving groove and protruding toward each other along a Y direction, the upper fixing member comprises two protruding portions which are positioned at the bottom portion of the upper fixing member and protrude outwardly from both side surfaces of the upper fixing member in the Y direction, the two protruding portions and a portion of the bottom portion of the upper fixing member between the two protruding portions are received in the receiving groove, each flanges stops the corresponding protruding portion from above.

In an embodiment, both the upper-layer battery module and the lower-layer battery module each have a protruding part protruding outwardly, a top surface of the upper fixing member attaches to the corresponding protruding part from below along the Z direction, a bottom surface of the lower fixing member attaches to the corresponding protruding part from above along the Z direction, the fastener also passes through the protruding part of the upper-layer battery module and the protruding part of the lower-layer battery module along the Z direction.

In order to achieve the above object, in another respect, the present disclosure provides a device which comprises the battery pack described above, and the battery pack is used for supplying power.

The present disclosure has the following beneficial effects: the fastener passes through the upper fixing member, the upper plate and the lower fixing member along the Z direction within the range in which the projections in the Z direction overlap, and the lower portion of the fastener exposed from the lower fixing member is fixed on the supporting mechanism, the supporting mechanism supports the lower-layer battery module and the lower fixing member, the upper-layer battery module is supported on the upper plate, thereby the battery pack of the present disclosure may arrange the battery modules in a double-layer manner. Since the fastener passes through the upper fixing member, the upper plate and the lower fixing member and fixed to the supporting mechanism along the Z direction within the range in which the projections in the Z direction overlap, the fixing member, the upper plate, the lower fixing member and the supporting mechanism are integrated, the structural rigidity is improved, the fastener can effectively resist the impact from the X direction and the impact from the Y direction; the fixing member, the upper plate, the lower fixing member and the supporting mechanism are connected through the fastener, so that the impact received is quickly and efficiently dispersed by the transfer of the fastener, thereby the battery pack according to the present disclosure can improve the stability of the double-layer battery module bracket.

Figure 1:
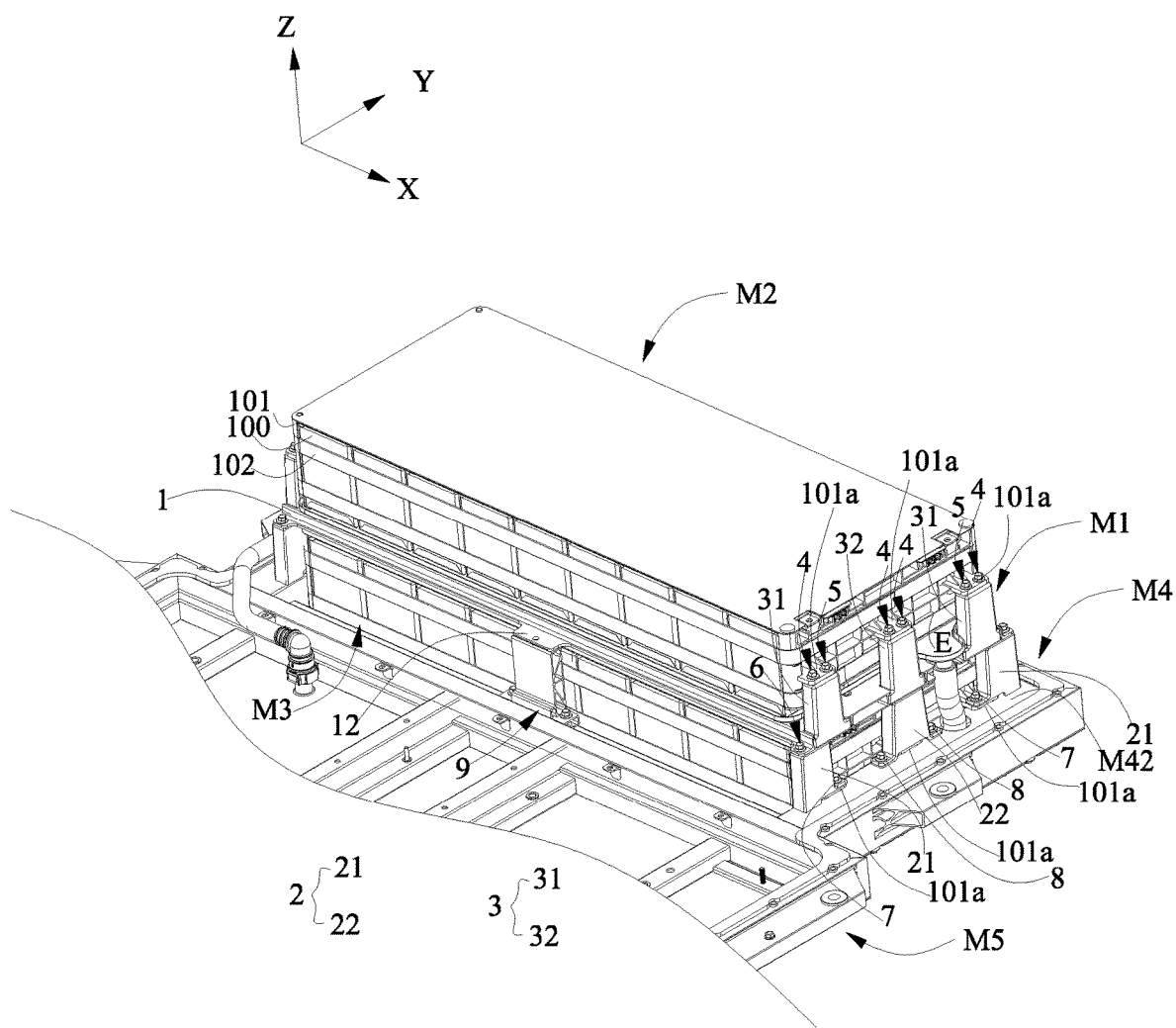
FIG. 1 is a partial perspective view of a battery pack according to the present disclosure.

Reference numerals in figures are represented as follows:
M1 double-layer battery module bracket
1 upper plate
  10 periphery edge
    SX first side
    SY second side
  11 receiving groove
    111 first receiving groove
      111a first upper opening
      111b first side opening
    112 second receiving groove
      112a second upper opening
      112b second side opening
  12 sheet body
  13 flange
    131 first flange
    132 second flange
  CX X-direction center line
  CY Y-direction center line
  14 heat exchanging plate
2 lower fixing member
  21 first lower fixing member
    210 upper surface
    211 first convex portion
  22 second lower fixing member
    220 upper surface
    221 second convex portion
3 upper fixing member
  31 first upper fixing member
    310 lower surface
    311 first protruding portion
  32 second upper fixing member
    320 lower surface
    321 second protruding portion
4 fastener
5 first locking member
6 second locking member
7 third locking member
8 fourth locking member
9 lower supporting member
  91 protrusion RL lower accommodating space
RU upper accommodating space
P protruding portion
M2 upper-layer battery module
M3 lower-layer battery module
M4 supporting mechanism
   M41 bottom plate
   M42 inner frame
   M43 outer frame
M5 single-layer battery module bracket
100 battery
101 end plate
101a protruding part
102 tie

DETAILED DESCRIPTION

The drawings illustrate embodiments of the present disclosure, and it will be understood that the disclosed embodiments are merely examples of the present disclosure, which can be implemented in various forms. Therefore, the specific details disclosed herein should not be construed as limitations, but as a basis of claims and as a basis of representation to instruct an ordinary person of skill in the art to implement the present disclosure in various ways.

Additionally, expressions indicating directions such as up, down, left, right, front, and back that are used to describe the operation and configuration of each part in embodiments are relative and not absolute, and are suitable when each part is in the orientation illustrated by the drawings; however, when the orientation of each part is changed, then these expressions should be interpreted to change corresponding to the changes in orientation.

Figure 2:
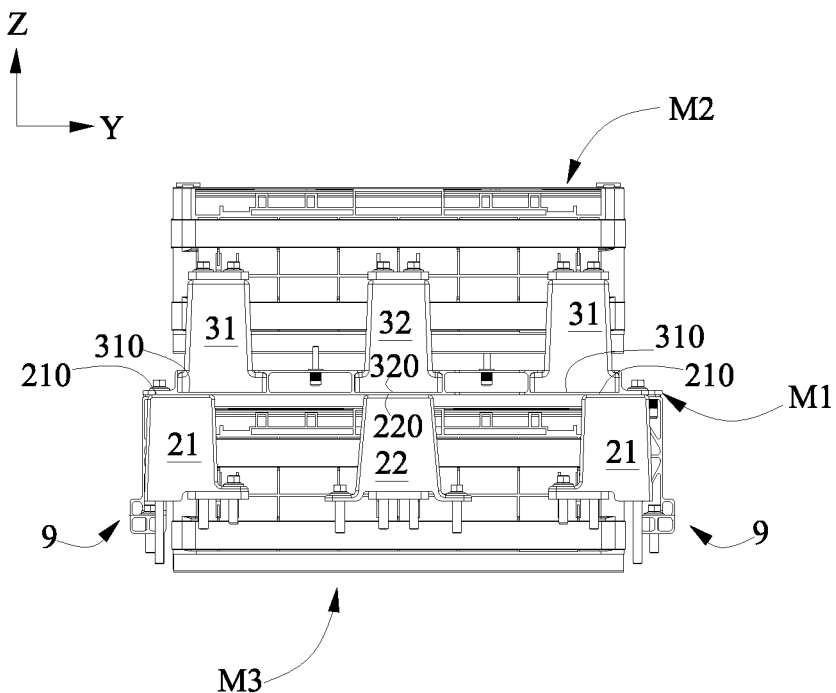
FIG. 2 is a left view of a double-layer battery module bracket assembled with an upper-layer battery module and a lower-layer battery module of the battery pack in FIG. 1.
Figure 3:
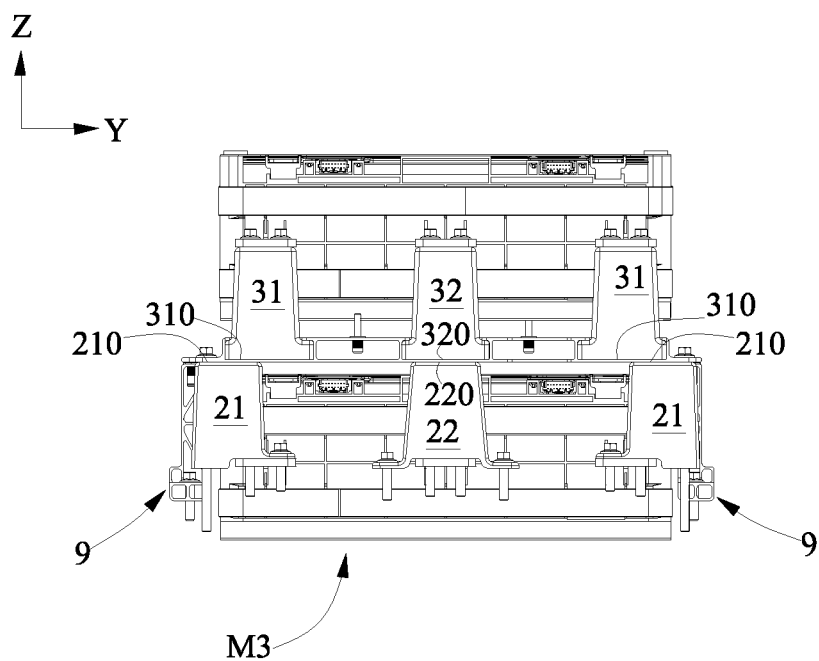
FIG. 3 is a right view of the double-layer battery module bracket assembled with the upper-layer battery module and the lower-layer battery module of the battery pack in FIG.
Figure 4:
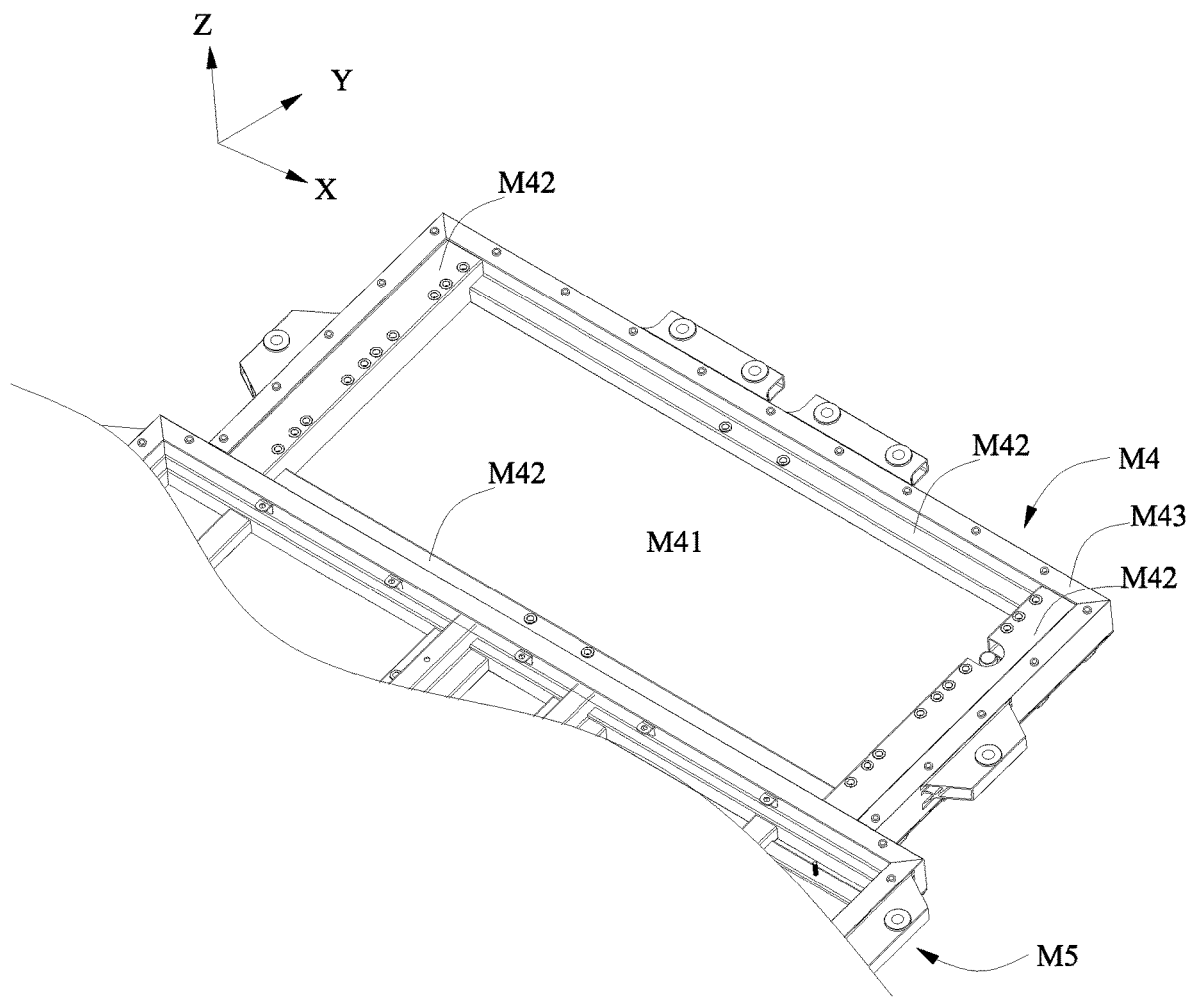
FIG. 4 is a perspective view of a supporting mechanism of the battery pack according to the present disclosure, in which a part of a single-layer battery module bracket is shown.

FIG. 1 is a partial perspective view of a battery pack according to the present disclosure. FIG. 2 is a left view of a double-layer battery module bracket assembled with an upper-layer battery module and a lower-layer battery module of the battery pack in FIG. 1. FIG. 3 is a right view of the double-layer battery module bracket assembled with the upper-layer battery module and the lower-layer battery module of the battery pack in FIG. 1. FIG. 4 is a perspective view of a supporting mechanism of the battery pack according to the present disclosure, in which a part of a single-layer battery module bracket is shown.

As shown in the figures, a battery pack comprises a double-layer battery module bracket M1, an upper-layer battery module M2, a lower-layer battery module M3 and a supporting mechanism M4. The battery pack may further comprise a single-layer battery module bracket M5. The double-layer battery module bracket M1 comprises an upper plate 1, a lower fixing member 2, an upper fixing member 3 and a fastener 4. A projection of a lower surface of the upper fixing member 3 and a projection of an upper surface of the lower fixing member 2 in a Z direction at least partially overlap. The fastener 4 passes through the upper fixing member 3, the upper plate 1 and the lower fixing member 2 along the Z direction within a range in which the projections in the Z direction overlap, a lower portion of the fastener 4 exposed from the lower fixing member 2 is fixed on the supporting mechanism M4. More specifically, both the upper-layer battery module M2 and the lower-layer battery module M3 each have a protruding part 101a protruding outwardly, a top surface of the upper fixing member 3 attaches to the corresponding protruding part 101a from below along the Z direction, a bottom surface of the lower fixing member 2 attaches to the corresponding protruding part 101a from above along the Z direction; correspondingly, the fastener 4 also passes through the protruding part 101a of the upper-layer battery module M2 and the protruding part 101a of the lower-layer battery module M3 along the Z direction, thus the upper-layer battery module M2 and the lower-layer battery module M3 are fixed together, therefore it is beneficial to improve the structural stability of the upper-layer battery module M2 and the lower-layer battery module M3, in turn ensures the working stability of the upper-layer battery module M2 and the lower-layer battery module M3. Further, in the example shown in the figures, the upper-layer battery module M2 and the lower-layer battery module M3 each comprise a plurality of batteries 100 which are arranged, end plates 101 positioned at both ends of the plurality of batteries 100 and a tie 102 tying up the plurality of batteries 100 and the end plates 101. Correspondingly, the protruding part 101a is provided on the corresponding end plate 101, which helps to improve the integration of components and reduce cost. The battery 100 generally comprises a case and an electrode assembly and an electrolyte received in the case. The electrode assembly comprises a positive electrode plate, a negative electrode plate and a separator. The battery 100 may be a can-type (or rigid case) battery, as shown in FIG. 1, correspondingly, the case comprises a cap assembly and an outer case assembled with the cap assembly; or the battery 100 may be a pouch-type (or flexible case) battery (not shown), the case is made of a packaging film (such as an aluminum plastic film). The double-layer battery module bracket M1 further comprises a first locking member 5, a second locking member 6, a third locking member 7 and a fourth locking member 8. The double-layer battery module bracket M1 further comprises a lower supporting member 9. The supporting mechanism M4 supports the lower-layer battery module M3 and the lower fixing member 2. In the example of FIG. 4, the supporting mechanism M4 comprises: a bottom plate M41 supporting the lower-layer battery module M3 from below; and an inner frame M42 fixedly connected with the bottom plate M41 and supporting the lower fixing member 2 from below, the lower portion of the fastener 4 is fixed to the inner frame M42. The inner frame M42 may be an integral structure or comprises a plurality of pieces welded together sequentially. The supporting mechanism M4 further comprises: an outer frame M43 surrounding the inner frame M42 and fixedly connected with the inner frame M42. The single-layer battery module bracket M5 is arranged with the supporting mechanism M4 side by side and connected with the supporting mechanism M4, the single-layer battery module bracket M5 supports a battery module in single-layer (not shown).

The double-layer battery module bracket of the battery pack according to the present disclosure will be described in more detail below.

Figure 5:
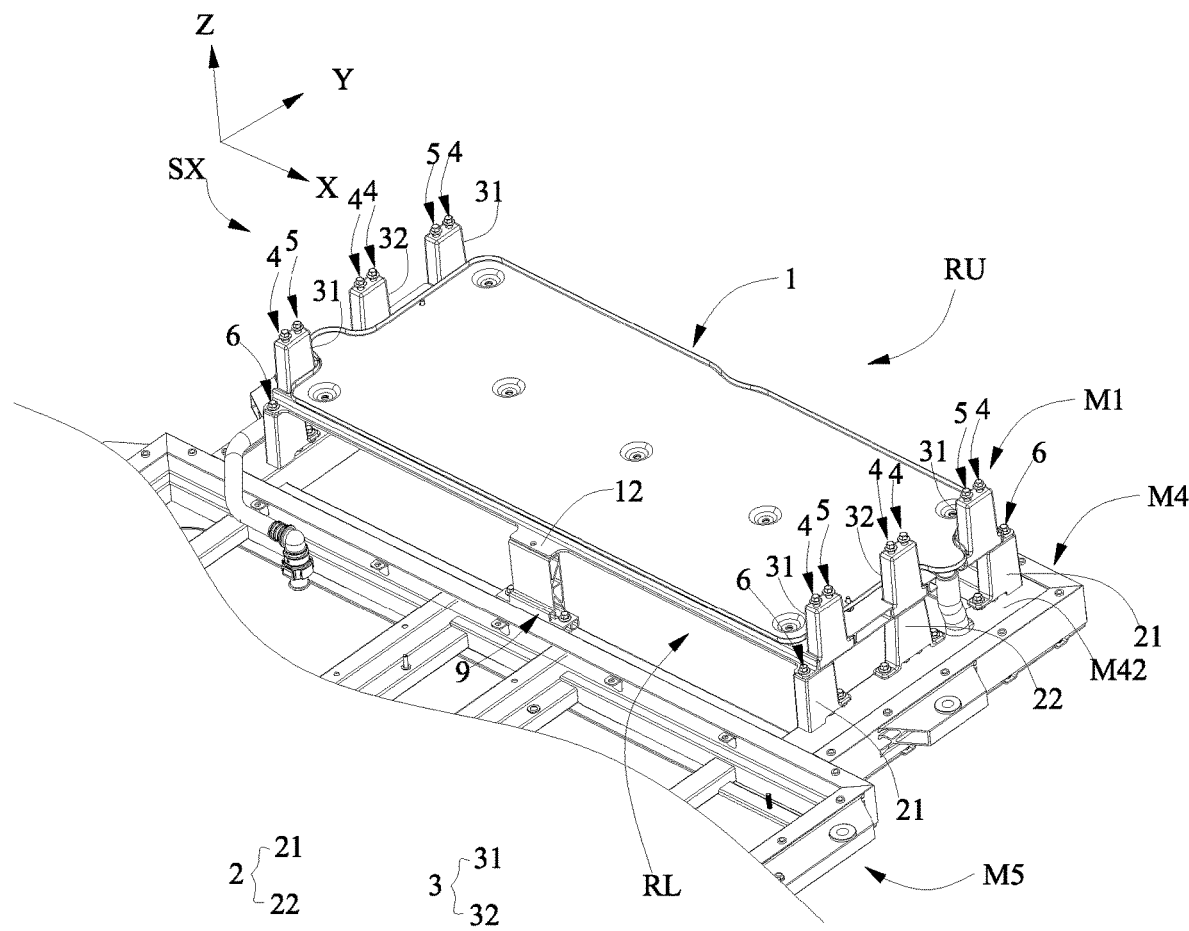
FIG. 5 is a simplified view of FIG. 1, in which the upper-layer battery module and the lower-layer battery module are removed to clearly show the double-layer battery module bracket of the battery pack.
Figure 6:
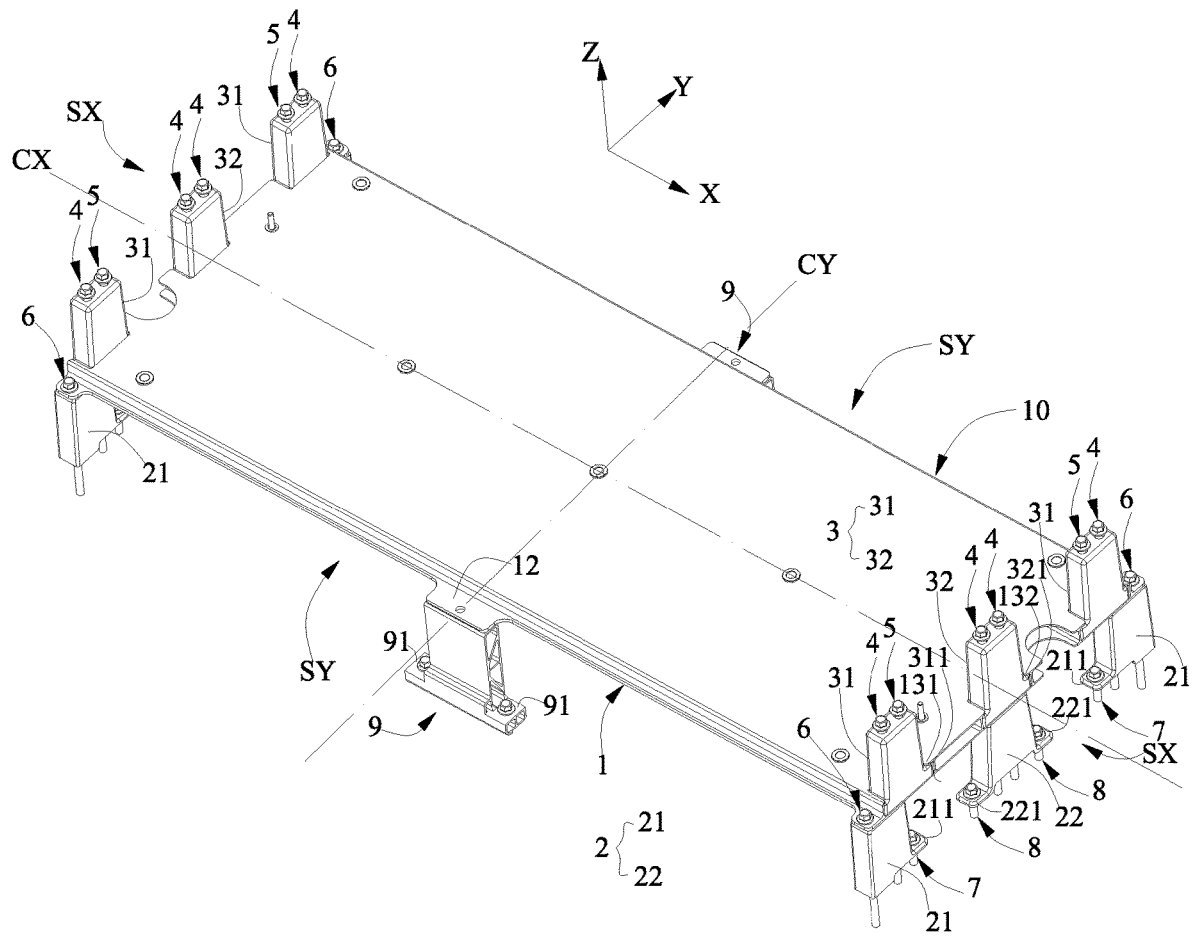
FIG. 6 is an assembled perspective view of the double-layer battery module bracket of the battery pack according to the present disclosure, in which a heat exchanging plate is removed.
Figure 7:
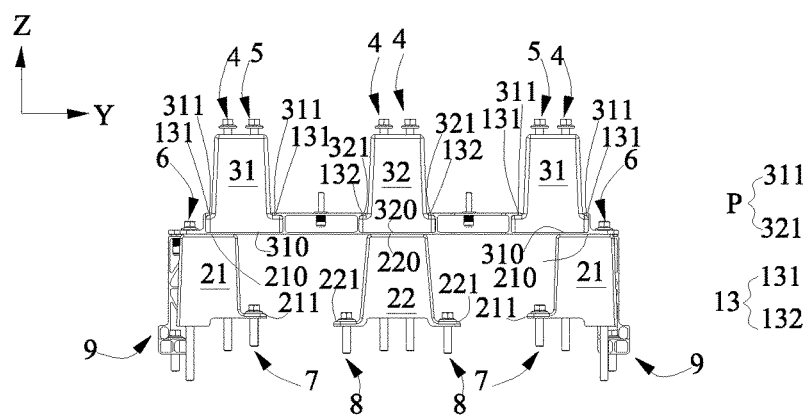
FIG. 7 is a side view of FIG. 6.
Figure 8:
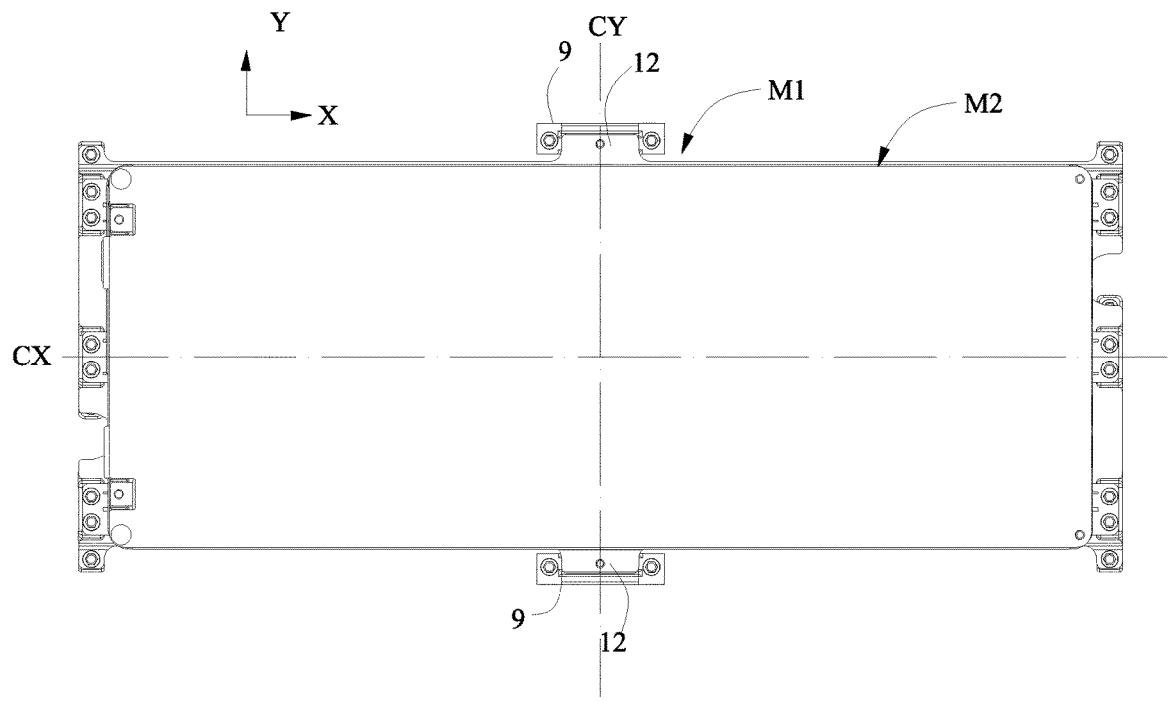
FIG. 8 is a top view of FIG. 6.
Figure 9:
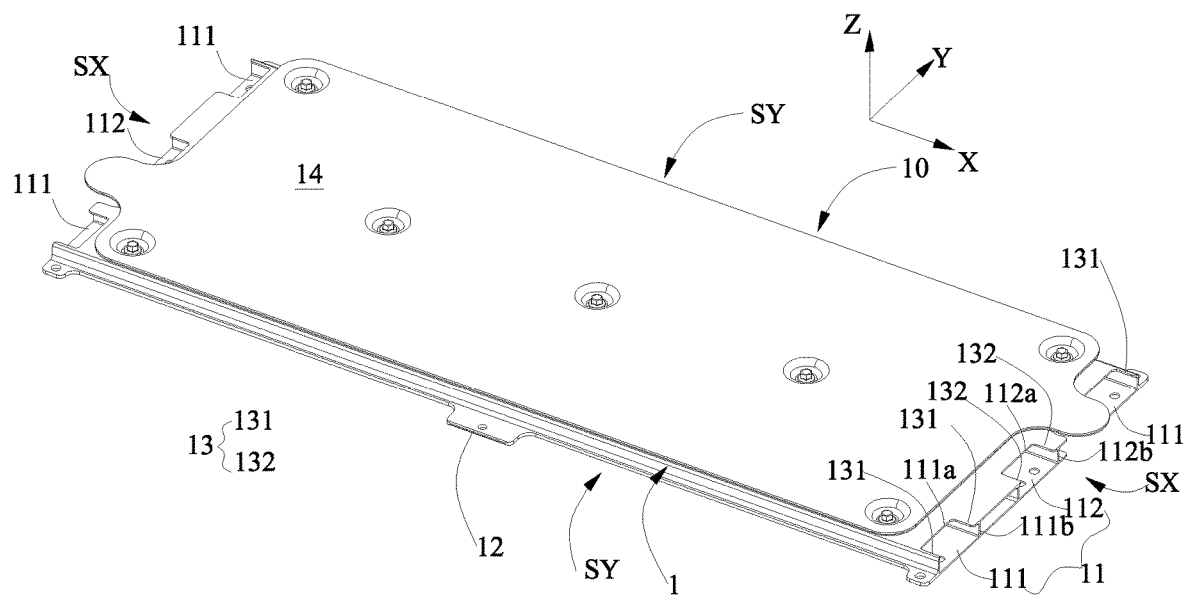
FIG. 9 is a perspective view of an upper plate of the double-layer battery module bracket.

FIG. 5 is a simplified view of FIG. 1, in which the upper-layer battery module and the lower-layer battery module are removed to clearly show the double-layer battery module bracket of the battery pack. FIG. 6 is an assembled perspective view of the double-layer battery module bracket of the battery pack according to the present disclosure, in which a heat exchanging plate is removed. FIG. 7 is a side view of FIG. 6. FIG. 8 is a top view of FIG. 6. FIG. 9 is a perspective view of an upper plate of the double-layer battery module bracket.

A periphery edge 10 of the upper plate 1 has a first side SX along an X direction and a second side SY along a Y direction, as shown in FIG. 6 and FIG. 8. The upper plate 1 further comprises a receiving groove 11 positioned at the periphery edge 10, as shown in FIG. 9. The upper plate 1 further comprises a sheet body 12 protruding from the second side SY, as shown in FIG. 6 and FIG. 8. The upper plate 1 further comprises flanges 13 formed at the receiving groove 11 and protruding toward each other along the Y direction, as shown in FIG. 9. The upper plate 1 further comprises a heat exchanging plate 14, the heat exchanging plate 14 exchanges heat with the upper-layer battery module M2. Certainly, the heat exchanging plate 14 shown in the figures can be omitted, and a different heat exchange means with additional configuration position and configuration mode can be used. A bottom portion of the upper fixing member 3 is received in the receiving groove 11, which is beneficial to lower the height of the upper fixing member 3, lower the centre of gravity of the double-layer battery module bracket M1, and improve the stability of the double-layer battery module bracket M1. Specifically, as shown in FIG. 9, the receiving groove 11 comprises a first receiving groove 111 and a second receiving groove 112. The first receiving groove 111 comprises a first upper opening 111a and a first side opening 111b, the first upper opening 111a opens upwardly and opens outwardly toward a side face of the periphery edge 10 to form a C-shape, the first side opening 111b opens outwardly toward the side face of the periphery edge 10. The second receiving groove 112 comprises a second upper opening 112a and a second side opening 112b, the second upper opening 112a opens upwardly and opens toward the side face of the periphery edge 10 to form a C-shape, the second side opening 112b opens outwardly toward the side face of the periphery edge 10. The sheet body 12 attaches to a top surface of the lower supporting member 9 from above and is fixedly connected with the lower supporting member 9. In the figures, the sheet body 12 is a flat plate, but not limited thereto, for example the sheet body 12 can be a U-shaped bending plate. The flanges 13 of the upper plate 1 comprise first flanges 131 and second flanges 132. The first flanges 131 are formed at the first upper opening 111a and protrude toward each other along the Y direction. The second flanges 132 are formed at the second upper opening 112a and protrude toward each other along the Y direction.

The lower fixing member 2 is positioned below the upper plate 1 and supports the upper plate 1, the lower fixing member 2 and the upper plate 1 are configured to enclose a lower accommodating space RL, the lower-layer battery module M3 is accommodated in the lower accommodating space RL, as shown in FIG. 5. More specifically, referring to FIG. 6 and FIG. 7, the lower fixing member 2 comprises a first lower fixing member 21. The lower fixing member 2 further comprises a second lower fixing member 22. The first lower fixing member 21 is integrally formed with a first convex portion 211, the first convex portion 211 protrudes from a bottom portion of the first lower fixing member 21 in a direction away from the second locking member 6. The second lower fixing member 22 is integrally formed with a second convex portion 221, the second convex portion 221 protrudes outwardly from a bottom portion of the second lower fixing member 22.

The upper fixing member 3 is positioned above the lower fixing member 2 and fixed to the upper plate 1, the upper fixing member 3 and the upper plate 1 are configured to enclose an upper accommodating space RU, as shown in FIG. 5. The upper-layer battery module M2 is accommodated in the upper accommodating space RU and supported on the upper plate 1.

More specifically, referring to FIG. 6 and FIG. 7, the upper fixing member 3 comprises a first upper fixing member 31. The upper fixing member 3 further comprises a second upper fixing member 32. Both the first upper fixing member 31 and the second upper fixing member 32 can be made of die casting aluminum alloy, thereby improving the impact resistance of the double-layer battery module bracket M1 while ensuring lightness by utilizing the light weight but high strength property of the die casting aluminum alloy.

The first upper fixing member 31 corresponds to the first lower fixing member 21. In FIG. 6 and FIG. 7, the first upper fixing member 31 is positioned at the first side SX of the periphery edge 10 of the upper plate 1. The first upper fixing member 31 is positioned above the first lower fixing member 21 and the first upper fixing member 31 is staggered along the Y direction with respect to the first lower fixing member 21, such that a projection of a lower surface 310 of the first upper fixing member 31 and a projection of an upper surface 210 of the first lower fixing member 21 in the Z direction partially overlap, the corresponding fastener 4 passes through the first upper fixing member 31 and the first lower fixing member 21 along the Z direction within a range in which the projections in the Z direction overlap. The staggering of the first upper fixing member 31 with respect to the first lower fixing member 21 along the Y direction causes a line connecting the centre of gravity of the first upper fixing member 31 and the centre of gravity of the first lower fixing member 21 to be inclined with respect to the Z direction in addition to providing the range required for the corresponding fastener 4 to pass through the first upper fixing member 31 and the first lower fixing member 21, which helps to disperse the impact in the Z direction (for example, when an electric vehicle travels on bumpy roads), the first upper fixing member 31 and the first lower fixing member 21 do not concentratedly transfer the impact in the Z direction directly through the upper plate 1 with respect to each other, but transfer a part of the impact in the Z direction in the range in which the projections in the Z direction overlap, and carry out the respective random and disperse transfer outside the range in which the projections in the Z direction overlap.

In FIG. 6 and FIG. 7, the second upper fixing member 32 is positioned at the first side SX of the periphery edge 10 of the upper plate 1 along the X direction. The second upper fixing member 32 is positioned just above the second lower fixing member 22, such that a projection of one of a lower surface 320 of the second upper fixing member 32 and an upper surface 220 of the second lower fixing member 22 in the Z direction falls entirely within a projection of the other of the lower surface 320 of the second upper fixing member 32 and the upper surface 220 of the second lower fixing member 22 (in other words, compared to the aforementioned partial overlap, this can be referred to as a full overlap), the corresponding fastener 4 passes through the second upper fixing member 32 and the second lower fixing member 22 along the Z direction in a range in which the projections in the Z direction overlap. By adopting the full overlap manner, the uniform distribution area of the force in the single Z direction (for example, gravity from the upper-layer battery module M2, the impact from the Z direction from the external) may be enhanced, and the impact resistance and the carrying capability in the Z direction may be improved, particularly when the second upper fixing member 32 and the second lower fixing member 22 are provided on a X-direction center line CX.

In FIG. 6 and FIG. 7, at the same first side SX of the periphery edge 10 of the upper plate 1, the corresponding first upper fixing member 31 and first lower fixing member 21 are provided on each of left and right sides of the X-direction center line CX of the upper plate 1. Staggering of the first upper fixing member 31 on the left side of the X-direction center line CX of the upper plate 1 with respect to the corresponding first lower fixing member 21 along the Y direction is opposite to staggering of the first upper fixing member 31 on the right side of the X-direction center line CX of the upper plate 1 with respect to the corresponding first lower fixing member 21 along the Y direction. The corresponding fastener 4 passes through the corresponding first upper fixing member 31 and first lower fixing member 21 along the Z direction within the corresponding range in which the projections in the Z direction overlap. The staggerings on the left and right sides of the X-direction center line CX are opposite, which helps to increase the dispersion direction of the aforementioned impact (that is, increasing the positive and negative directions of the Y direction); additionally, it helps for the symmetrical design.

As shown in FIG. 6, the first upper fixing members 31 and the second upper fixing members 32 positioned on the opposite first sides SX of the periphery edge 10 of the upper plate 1 are symmetrical in position and shape with respect to the Y-direction center line CY of the upper plate 1. The second upper fixing member 32 and the two first upper fixing members 31 positioned on the same first side SX of the periphery edge 10 of the upper plate 1 are symmetrical in position and shape with respect to the X-direction center line CX of the upper plate 1. The first upper fixing member 31 is provided at each of the four corners where the Y direction and the X direction of the periphery edge 10 of the upper plate 1 intersect. The structure shown in FIG. 6 is beneficial to the symmetrical design.

The upper fixing member 3 comprises two protruding portions P which are positioned at the bottom portion of the upper fixing member 3 and protrude outwardly from both side surfaces of the upper fixing member 3 in the Y direction, the two protruding portions P and a portion of the bottom portion of the upper fixing member 3 between the two protruding portions P are received in the receiving groove 11, each flange 13 stops the corresponding protruding portion P from above, thereby improving the structural stability in the Z direction. Specifically, referring to FIG. 6 and FIG. 7, the protruding portion P comprises a first protruding portion 311. The protruding portion P further comprises a second protruding portion 321.

The first protruding portions 311 are positioned at a bottom portion of the first upper fixing member 31 and respectively protrude outwardly from both side surfaces of the first upper fixing member 31 in the Y direction, the two first protruding portions 311 and a portion of the bottom portion of the first upper fixing member 31 between the two first protruding portion 311 are received in the first receiving groove 111. Further, the two first protruding portions 311 and the portion of the bottom portion of the first upper fixing member 31 between the two first protruding portions 311 are received in the first receiving groove 111 through the first side opening 111b, each first flange 131 stops the corresponding first protruding portion 311 from above, thereby enabling detachable mounting and positioning. As shown in FIG. 7, a portion above the two first protruding portions 311 of the first upper fixing member 31 has a trapezoidal shape, thereby facilitating weight reduction and lightness; and also helping to lower the centre of gravity, and improving the stability of the double-layer battery module bracket M1.

The second protruding portions 321 are positioned at a bottom portion of the second upper fixing member 32 and respectively protrude outwardly from opposite side surfaces of the second upper fixing member 32 in the Y direction, the two second protruding portions 321 and a portion of the bottom portion of the second upper fixing member 32 between the two second protruding portions 321 are received in the second receiving groove 112. Further, the two second protruding portions 321 and the portion of the bottom portion of the second upper fixing member 32 between the two second protruding portions 321 are received in the second receiving groove 112 through the second side opening 112b, each second flange 132 stops the corresponding second protruding portion 321 from above, thereby enabling detachable mounting and positioning. As shown in FIG. 7, a portion above the two second protruding portions 321 of the second upper fixing member 32 has a trapezoidal shape, similarly, thereby facilitating weight reduction and lightness; and also helping to lower the centre of gravity, and improving the stability of the double-layer battery module bracket M1.

The fastener 4 may be in the form of a bolt and a nut, to facilitate disassembling and assembling and adjusting of the impact resistance strength and the fastening force.

Referring to FIG. 6 and FIG. 7 in combination with FIG. 1, the first locking member 5 is arranged side by side with the corresponding fastener 4. The first locking member 5 passes through the first upper fixing member 31 and the upper plate 1 along the Z direction outside the range in which the projections in the Z direction overlap and fixes the first upper fixing member 31 to the upper plate 1. On the basis of the fastener 4, the first locking member 5 helps to further enhance the impact resistance of the double-layer battery module bracket M1 and improve the stability of the first upper fixing member 31. The first locking member 5 may be in a form of a bolt and a nut to facilitate disassembling and assembling and adjusting of the fastening force.

Referring to FIG. 6 and FIG. 7 in combination with FIG. 1, the second locking member 6 is arranged side by side with the corresponding fastener 4, the second locking member 6 passes through the upper plate 1 and the first lower fixing member 21 along the Z direction outside the range in which the projections in the Z direction overlap and fixes the first upper plate 1 and the first lower fixing member 21 on the supporting mechanism M4. Similarly, on the basis of the fastener 4, the second locking member 6 helps to further enhance the impact resistance of the double-layer battery module bracket M1 and improve the stability of the first lower fixing member 21. The second locking member 6 may be in a form of a bolt and a nut to facilitate disassembling and assembling and adjusting of the fastening force.

Referring to FIG. 6 and FIG. 7 in combination with FIG. 1, the third locking member 7 passes through the first convex portion 211 along the Z direction and fixes the first lower fixing member 21 on the supporting mechanism M4 (more specifically on the inner frame M42). Similarly, on the basis of the fastener 4, the third locking member 7 helps to further enhance the impact resistance of the double-layer battery module bracket M1 and improve the stability of the first lower fixing member 21, especially when the third locking member 7 is used together with the second locking member 6. Further, as shown in FIG. 1, the third locking member 7 also passes through the protruding part 101a of the lower-layer battery module M3, thereby further improving the stability of the lower-layer battery module M3 on the basis that the corresponding fastener 4 passes through the protruding part 101a of the lower-layer battery module M3. The third locking member 7 may be in a form of a bolt and a nut to facilitate disassembling and assembling and adjusting of the fastening force.

Referring to FIG. 6 and FIG. 7 in combination with FIG. 1, the fourth locking member 8 passes through the second convex portion 221 of the second lower fixing member 22 along the Z direction and fixes the second lower fixing member 22 on the supporting mechanism M4 (more specifically on the inner frame M42). Similarly, on the basis of the fastener 4, the fourth locking member 8 helps to further enhance the impact resistance of the double-layer battery module bracket M1 and improve the stability of the second lower fixing member 22. The fourth locking member 8 may be in a form of a bolt and a nut to facilitate disassembling and assembling and adjusting of the fastening force.

Referring to FIG. 6 and FIG. 8, the lower supporting member 9 is positioned at the second side SY of the periphery edge 10 of the upper plate 1 along the Y direction. An upper side of the lower supporting member 9 in the Z direction is fixedly connected to the upper plate 1 (specifically to the sheet body 12), a lower side of the lower supporting member 9 in the Z direction is fixedly connected to the supporting mechanism M4 (more specifically to the inner frame M42). The configuration of the lower supporting member 9 helps to enhance the resistance to the impact in the Y direction. The lower supporting members 9 positioned on the opposite second sides SY of the periphery edge 10 of the upper plate 1 are symmetrical in position and shape with respect to the X-direction center line CX of the upper plate 1. Referring to FIG. 1, the batteries 100 of the upper-layer battery module M2 are arranged along the X direction, and the upper plate 1 would be deflected downwardly at the Y-direction center line CY due to the arranged batteries 100, when the lower supporting members 9 are positioned on the Y-direction center line CY, the lower supporting members 9 can provide sufficient support to avoid the downward deflection of the upper plate 1, thereby improving the positional stability of the upper-layer battery module M2 and improving the structural stability of the double-layer battery module bracket M1. The lower side of the lower supporting member 9 in the Z direction has protrusions 91 protruding outwardly from opposite side surfaces of the lower supporting member 9 in the X direction, each protrusion 91 attaches to the supporting mechanism M4 (more specifically the inner frame M42) from above and is fixedly connected (for example by screw or adhesive) with the supporting mechanism M4 together, the protrusion 91 may increase a contact area on the supporting mechanism M4, and enhance the supporting stability of the lower supporting member 9 to the upper plate 1. The lower supporting member 9 may be aluminum alloy extrusion profile, which not only can attain lightness, but also can guarantee the supporting strength and the impact resistance and torsion resistance.

In the battery pack according to the present disclosure, the fastener 4 passes through the upper fixing member 3, the upper plate 1 and the lower fixing member 2 along the Z direction within the range in which the projections in the Z direction overlap, and the lower portion of the fastener 4 exposed from the lower fixing member 2 is fixed on the supporting mechanism M4, the supporting mechanism M4 supports the lower-layer battery module M3 and the lower fixing member 2, the upper-layer battery module M2 is supported on the upper plate 1, thereby the battery pack of the present disclosure may arrange the battery modules in a double-layer manner. Since the fastener 4 passes through the upper fixing member 3, the upper plate 1 and the lower fixing member 2 and fixed to the supporting mechanism M4 along the Z direction within the range in which the projections in the Z direction overlap, the fixing member 3, the upper plate 1, the lower fixing member 2 and the supporting mechanism M4 are integrated, the structural rigidity is improved, the fastener 4 can effectively resist the impact from the X direction and the impact from the Y direction; the fixing member 3, the upper plate 1, the lower fixing member 2 and the supporting mechanism M4 are connected through the fastener 4, so that the impact received is quickly and efficiently dispersed by the transfer of the fastener 4, thereby the battery pack according to the present disclosure can improve the stability of the double-layer battery module bracket M1.

The above detailed description describes various exemplary embodiments, but is not intended to be limited to the specifically disclosed combinations. Accordingly, the various features disclosed herein can be combined together to form a plurality of additional combinations that are not shown for the sake of clarity.

The invention claimed is:

1. A battery pack, comprising a double-layer battery module bracket, an upper-layer battery module, a lower-layer battery module and a supporting mechanism;
   the double-layer battery module bracket comprising:
   an upper plate;
   a lower fixing member positioned below the upper plate and supporting the upper plate, the lower fixing member and the upper plate being configured to enclose a lower accommodating space;
   an upper fixing member positioned above the lower fixing member and fixed to the upper plate, the upper fixing member and the upper plate being configured to enclose an upper accommodating space, a projection of a lower surface of the upper fixing member and a projection of an upper surface of the lower fixing member in a Z direction at least partially overlapping; and
   a fastener passing through the upper fixing member, the upper plate and the lower fixing member along the Z direction within a range in which the projections in the Z direction overlap, a lower portion of the fastener exposed from the lower fixing member being fixed on the supporting mechanism;
   the upper-layer battery module being accommodated in the upper accommodating space and supported on the upper plate;
   the lower-layer battery module being accommodated in the lower accommodating space;
   the supporting mechanism supporting the lower-layer battery module and the lower fixing member;
   each of the upper-layer battery module and the lower-layer battery module comprising a plurality of batteries which are arranged between two end plates positioned at both ends of the plurality of batteries,
   both the upper-layer battery module and the lower-layer battery module each having a protruding part protruding outwardly, and
   a top surface of the upper fixing member attaching to a corresponding protruding part of the upper-layer battery module from below along the Z direction, a bottom surface of the lower fixing member attaching to a corresponding protruding part of the lower-layer battery module from above along the Z direction, the fastener also passing through the protruding part of the upper-layer battery module and the protruding part of the lower-layer battery module along the Z direction, wherein:
   the upper plate comprises a receiving groove positioned at a periphery edge, a bottom portion of the upper fixing member is received in the receiving groove,
   the upper plate comprises flanges formed at the receiving groove and protruding toward each other along a Y direction that is perpendicular to the Z direction, and the upper fixing member comprises two protruding portions which are positioned at the bottom portion of the upper fixing member and protrude outwardly from both side surfaces of the upper fixing member in the Y direction, the two protruding portions and a portion of the bottom portion of the upper fixing member between the two protruding portions are received in the receiving groove, each flange stops a corresponding protruding portion from above.

2. The battery pack according to claim 1, wherein
the periphery edge of the upper plate has a first side along an X direction;
the lower fixing member comprises a first lower fixing member;
the upper fixing member comprises a first upper fixing member, the first upper fixing member is positioned at the first side of the periphery edge of the upper plate, the first upper fixing member corresponds to the first lower fixing member;
the first upper fixing member is positioned above the first lower fixing member and the first upper fixing member is staggered along the Y direction with respect to the first lower fixing member, such that a projection of a lower surface of the first upper fixing member and a projection of an upper surface of the first lower fixing member in the Z direction partially overlap, the fastener passes through the first upper fixing member and the first lower fixing member along the Z direction within a range in which the projections in the Z direction overlap.

3. The battery pack according to claim 2, wherein
at the same first side of the periphery edge of the upper plate, the corresponding first upper fixing member and first lower fixing member are provided on each of left and right sides of an X direction center line of the upper plate;
staggering of the first upper fixing member on the left side of the X direction center line of the upper plate with respect to the corresponding first lower fixing member along the Y direction is opposite to staggering of the first upper fixing member on the right side of the X direction center line of the upper plate with respect to the corresponding first lower fixing member along the Y direction;
the corresponding fastener passes through the corresponding first upper fixing member and first lower fixing member along the Z direction within the corresponding range in which the projections in the Z direction overlap.

4. The battery pack according to claim 2, wherein
the double-layer battery module bracket further comprises a first locking member, the first locking member is arranged side by side with the corresponding fastener, the first locking member passes through the first upper fixing member and the upper plate along the Z direction outside the range in which the projections in the Z direction overlap and fixes the first upper fixing member to the upper plate.

5. The battery pack according to claim 2, wherein
the double-layer battery module bracket further comprises a second locking member, the second locking member is arranged side by side with the corresponding fastener,
the second locking member passes through the upper plate and the first lower fixing member along the Z direction outside the range in which the projections in the Z direction overlap and fixes the upper plate and the first lower fixing member on the supporting mechanism.

6. The battery pack according to claim 5, wherein
the first lower fixing member is integrally formed with a first convex portion, the first convex portion protrudes from a bottom portion of the first lower fixing member in a direction away from the second locking member;
the double-layer battery module bracket further comprises a third locking member, the third locking member passes through the first convex portion along the Z direction and fixes the first lower fixing member on the supporting mechanism.

7. The battery pack according to claim 3, wherein
the upper fixing member further comprises a second upper fixing member, the second upper fixing member is positioned at the first side of the periphery edge of the upper plate along the X direction;
the lower fixing member comprises a second lower fixing member, the second upper fixing member is positioned just above the second lower fixing member, such that a projection of a first one of (i) a lower surface of the second upper fixing member and (ii) an upper surface of the second lower fixing member in the Z direction falls entirely within a projection of a second one of (i) the lower surface of the second upper fixing member and (ii) the upper surface of the second lower fixing member, the corresponding fastener passes through the second upper fixing member and the second lower fixing member along the Z direction in a range in which the projections in the Z direction overlap.

8. The battery pack according to claim 1, wherein
the periphery edge of the upper plate has a second side along the Y direction;
the double-layer battery module bracket further comprises a lower supporting member, the lower supporting member is positioned at the second side of the periphery edge of the upper plate along the Y direction, an upper side of the lower supporting member in the Z direction is fixedly connected to the upper plate, a lower side of the lower supporting member in the Z direction is fixedly connected to the supporting mechanism.

9. A device, comprising a battery pack, wherein the battery pack is the battery pack according to claim 1, and the battery pack is used for supplying power.

* * * * *